United States Patent
Foster et al.

(10) Patent No.: US 12,275,262 B2
(45) Date of Patent: Apr. 15, 2025

(54) THERMAL DONOR LAMINATE FORMULATION AND THERMAL DONOR ELEMENTS COMPRISING THE SAME

(71) Applicant: Kodak Alaris Inc., Rochester, NY (US)

(72) Inventors: David Foster, Rochester, NY (US); Michael Schild, Rochester, NY (US); Robert Wagner, Rochester, NY (US); Cheryl Brongo, Rochester, NY (US); Jared Emmons, Rochester, NY (US)

(73) Assignee: Kodak Alaris LLC, Rochester, NY (US)

( * ) Notice: Subject to any disclaimer, the term of this patent is extended or adjusted under 35 U.S.C. 154(b) by 81 days.

(21) Appl. No.: 17/090,541

(22) Filed: Nov. 5, 2020

(65) Prior Publication Data

US 2021/0138819 A1     May 13, 2021

Related U.S. Application Data

(60) Provisional application No. 62/933,104, filed on Nov. 8, 2019.

(51) Int. Cl.
    *B41M 5/395*      (2006.01)
    *C08L 33/02*      (2006.01)

(52) U.S. Cl.
    CPC ............ *B41M 5/395* (2013.01); *C08L 33/02* (2013.01); *C08L 2205/03* (2013.01)

(58) Field of Classification Search
    CPC .. C08L 33/12; C08L 29/14; C08L 1/10; C08L 1/12; C08L 1/14; B41M 7/0027; B41M 5/38264; B41M 5/395; C09D 133/12; C09D 129/14; C09D 101/10; C09D 101/12; C09D 101/14
See application file for complete search history.

(56) References Cited

U.S. PATENT DOCUMENTS

| | | | |
|---|---|---|---|
| 4,855,281 A | 8/1989 | Byers | |
| 4,916,112 A | 4/1990 | Henzel et al. | |
| 4,927,803 A | 5/1990 | Bailey et al. | |
| 5,023,228 A | 6/1991 | Henzel | |
| 5,322,832 A * | 6/1994 | Takeyama | B41M 7/0027 503/227 |
| 5,627,008 A * | 5/1997 | Defieuw | G03C 1/4989 430/350 |
| 6,083,610 A * | 7/2000 | Hirose | G09F 3/02 428/32.84 |
| 7,301,012 B2 | 11/2007 | Fujiwara | |
| 7,384,138 B2 | 6/2008 | Taguchi | |
| 7,501,382 B2 | 3/2009 | Foster et al. | |
| 2006/0068174 A1 | 3/2006 | Sato | |

FOREIGN PATENT DOCUMENTS

| | | | |
|---|---|---|---|
| CN | 103 966 899 | 4/2016 | |
| EP | 1179753 A1 | 2/2002 | |
| EP | 3330330 A1 * | 6/2018 | |
| GB | 2309538 A | 7/1997 | |
| JP | 2005275024 | 10/2005 | |
| SU | 1 052 527 | 11/1983 | |
| WO | 03072666 A2 | 9/2003 | |
| WO | WO-2005032841 A1 * | 4/2005 | ........ B41M 5/38207 |

OTHER PUBLICATIONS

International Preliminary Report on Patentability mailed May 10, 2022 in PCT/US2020/059127.
Communication pursuant to Article 94(3) EPC issued in EP Application No. 20 817 118.1, dated Nov. 9, 2023.
"Compsn. for restoration of marble sculptures—contains polyvinylbutyral poly methyl methacrylate, alcohol solvent and pigments", Derwent, XP002354453.

* cited by examiner

*Primary Examiner* — John M Cooney
*Assistant Examiner* — Jeffrey S Lenihan
(74) *Attorney, Agent, or Firm* — HOGAN LOVELLS US LLP

(57) ABSTRACT

Described herein are embodiments of thermal donor laminate formulations and thermal transfer donor elements comprising the same. Thermal donor elements described herein can be used to transfer the laminate onto thermal receiver elements using thermal transfer means to create a transparent, protective overcoat film. In certain embodiments, the laminate is formulated without colloidal silica. Laminate formulations comprise appropriate solvent packages to account for the removal of colloidal silica, including, in some embodiments, solvent packages that do not include DEK. Certain embodiments described herein exhibit advantageous performance characteristics, such as avoiding and/or mitigating flash, satin back transfer, and print artifacts, and resist scratches.

8 Claims, No Drawings

THERMAL DONOR LAMINATE FORMULATION AND THERMAL DONOR ELEMENTS COMPRISING THE SAME

CROSS-REFERENCE TO RELATED APPLICATIONS

This application is claims priority to U.S. provisional application No. 62/933,104, filed on Nov. 8, 2019.

FIELD OF THE INVENTION

Described herein are embodiments of thermal donor laminate formulations and thermal transfer donor elements comprising the same. Thermal donor elements described herein can be used to transfer the laminate onto any suitable substrate/receiver, including, for example thermal receiver photo paper, identification cards, key cards etc., using thermal transfer means to create a transparent, protective overcoat film. Also described herein are methods of manufacturing thermal donor laminate formulations.

BACKGROUND OF THE INVENTION

There are many ways of forming an image. For example, images can be formed through thermal transfer of dyes, inkjet applications, electrophotographic reproduction, and silver halide image development.

To form any printed image, the image can be chemically developed from film, or developed from an electronic signal generated from a digital capture device or by scanning a film. For thermal, inkjet, and electrophotographic printing, electronic signals indicating appropriate colors are used to produce cyan, magenta, yellow, and black color signals. These signals are then transmitted to a printer where colored material is transferred to an appropriate receiver element. A color hard copy is thus obtained that corresponds to the original image.

Thermal transfer prints are susceptible to re-transfer of colorants to adjacent surfaces, to discoloration by fingerprints because the colorants remain at the surface of the receiver element, and to scratches during imaging and handling. Heat can be used to drive the colorants deeper into the receiver element. Application of a laminate, a transparent protective overcoat, onto these types of color images effectively reduces these problems. The transparent protective overcoat can also provide improved light stability if a ultraviolet (UV) absorbing compound is incorporated in the formulation. The protective overcoat may also be referred to as a thermal donor laminate, or just laminate. This transparent protective layer can be provided as the sole transferrable material in a thermal transfer donor element, or it can be provided as multiple patches, with or without separate patches containing thermal transferable dyes.

The thermal transferable protective laminates currently being used in various thermal products comprise a transparent polymeric layer on a support. That polymeric layer may be transparent and may be made from various components designed to provide needed properties and to solve various problems. For instance, protective laminate overcoats preferably mitigate or avoid "flash," which is a print defect in which the resulting print has rough or jagged edges. Generally, laminate overcoat patches on thermal donor elements are slightly larger than the print area. When the donor element is separated from the receiver element, laminate can remain around the edges of the print. In other words, the laminate to be transferred prematurely separates from the donor ribbon (support), resulting in irregular edges and defects in the resulting images—i.e., a "flash" issue.

Another disadvantageous print defect is called "satin back transfer." Satin printing requires a heating protocol in the printer that adds additional heat to the image. Satin back transfer is a print defect that occurs with this type of printing, where some transfer back to the donor is seen in the laminate patch printing.

Quality thermal printing also requires image stability. Image stability is a measure of an image's resistance to high intensity daylight. A laminate overcoat needs to protect the image to preserve it and promote image stability. Laminate overcoats must also provide suitable gloss and protect against print handling artifacts (e.g., smudges and scratches) and iridescence. Thus, the laminate formulation must be designed to provide excellent performance across a number of properties (e.g., image finishing and image protection).

Some laminate formulations in use today include colloidal silica dispersed in isopropyl alcohol (referred to herein as merely "colloidal silica"). The purpose of colloidal silica in a laminate formulation is to give straight edges when the laminate is removed from the print. In other words, colloidal silica has long been used to reduce or minimize flash. However, colloidal silica materials dispersed in organic solvents have been high on the list for desired replacement because of their high cost and low pH. Indeed, colloidal silica materials are one of the most expensive type of materials typically used in laminate formulations. Due to their very low pH ($<1$), they can cause mixing issues with other laminate materials and additives.

There is a need to provide a clear protective laminate that provides optimal performance properties (e.g., no flash or satin back transfer, scratch resistance etc.) and that does not include colloidal silica. The removal of colloidal silica from laminate formulations is advantageous to provide more cost effective and robust thermal donor overcoats. The laminate formulation embodiments described herein are intended to address the needs described above, among others.

SUMMARY OF THE INVENTION

Embodiments described herein are directed to thermal donor laminate formulations for use in thermal printing, and thermal donor elements incorporating the same. In certain embodiments, the laminate is formulated without colloidal silica. Laminate formulations comprise appropriate solvent packages to account for the removal of colloidal silica, including, in some embodiments, solvent packages that do not include 3-pentanone (also known as diethyl ketone or "DEK"). Certain embodiments described herein exhibit advantageous performance characteristics, such as avoiding and/or mitigating flash, satin back transfer, and print artifacts, and promoting scratch resistance and gloss.

Embodiments of thermal transfer donor elements described herein can be used to provide protective transparent films on thermal transfer receiver elements at less cost and better overall performance characteristics. The polymeric formulation used to make up the thermal transferable protective transparent films have been designed with less colloidal silica than has been previously used, but with no loss in properties. In other words, less colloidal silica—even the complete removal of that material—can be used in the formulations described herein, while still accounting for and mitigating the "flash." In certain embodiments, colloidal silica has been replaced with particularly designed additive polymers, in specifically designed amounts in relation to other materials in the overall laminate formulations.

According to one embodiment, a composition for a thermal laminate formulation comprises a polymeric binder resin, polymethyl methacrylate ("PMMA"), and one or more organic solvents. The polymeric binder may be included in the composition in an amount ranging from 10 to 70 milligrams per square foot (mgs/sqft); PMMA may be included in the composition in an amount ranging from 0 to 50 mgs/sqft. Unless otherwise indicated, amounts of material (e.g., in units of mgs/sqft) are provided herein in reference to the amount of material in dry laydown of laminate overcoat. In certain embodiments, the polymeric binder resin may be a thermoplastic vinyl resin, such as a polyvinyl acetal resin. In certain embodiments, the laminate formulation may further comprise a second thermoplastic resin—namely, a cellulose ester, such as cellulose acetate propionate ("CAP"). CAP may be included in the composition in an amount ranging from 0 to 25 mgs/sqft. In other embodiments, the composition may include other addenda that provide feature characteristics (e.g., release agents, UV absorbers).

Representative commercial polymeric resins suitable for use in laminate formulations described herein include, but are not limited to, CAP-482-20 cellulose acetate propionate (Eastman Chemical Company), and KS-1, KS-3 and KS-5 poly(vinyl acetal) resins (Sekisui, Japan).

The laminate compositions described herein can be incorporated into thermal transfer donor elements, which can be used to transfer transparent protective films onto thermal receiver elements using thermal transfer means. Such thermal donor elements are components of thermal printing assemblies and methods of use, wherein the thermal transfer donor element is arranged in thermal association with a thermal receiver element to facilitate the transfer of dye to form a thermal print image, followed by transfer of the laminate formulation to form a protective overcoat.

DETAILED DESCRIPTION OF THE INVENTION

The use of numerical values in the various ranges specified herein, unless otherwise expressly indicated otherwise, are considered to be approximations as though the minimum and maximum values within the stated ranges were both preceded by the word "about." In this manner, it should be understood that slight variations above and below the stated ranges can be used to achieve substantially the same results as the values within the ranges. Additionally, the disclosure of these ranges is intended as a continuous range including every value between the minimum and maximum values.

Unless otherwise indicated, the terms "thermal transfer donor element" or "donor element" may be used interchangeably. Such donor elements can transfer thermal, protective, transparent protective overcoat films in the presence of, or upon being exposed to, thermal energy (or heat). The same or different donor elements can be used to thermally transfer one or more different dye images. As mentioned previously, the terms "thermal protective overcoat," "transparent overcoat," "overcoat," "thermal donor laminate," and "laminate" (or any variations of these terms) may be used interchangeably.

Embodiments of thermal transfer donor element of this invention comprise a polymeric support (described below) having at least a portion thereof coated with one or more heat transferable materials, wherein at least one of those heat transferable materials is the thermally transferable protective transparent film described in more detail below.

Thermal Transfer Donor Elements

Support: Various polymeric material can be used as the polymeric support for the thermal transfer donor elements, provided the material is dimensionally stable and can withstand the heat of thermal transfer, for example from a thermal printing head. Suitable materials can include, but are not limited to, polyesters such as poly(ethylene terephthalate) and poly(ethylene naphthalate), polyamides, polycarbonates, glassine paper, condenser paper, cellulose esters such as cellulose acetate, fluorine polymers such as poly (vinylidene fluoride) or poly(tetrafluoroethylene-co-hexafluoropropylene), polyethers such as polyoxymethylene, polyacetals, polyolefins such as polystyrene, polyethylene, polypropylene or methylpentene polymers, and polyimides such as polyimide amides and polyetherimides. The polymeric support can have a thickness of at least 2 µm and up to and including 30 µm, although thicker or thinner supports could be used for specific applications.

Dye-Containing Thermal Transferable Materials: Any ink or dye can be used in a thermal dye transfer donor element that can be used in conjunction with the thermal transfer donor elements of the present invention. Known features of such thermal dye transfer donor elements are described, for example, in U.S. Pat. No. 4,916,112 (Henzel et al.), U.S. Pat. No. 4,927,803 (Bailey et al.), and U.S. Pat. No. 5,023,228 (Henzel), the disclosures of which are all incorporated herein by reference. Forming a dye transfer image generally involves imagewise heating a dye-containing heat transferable material to one or both sides of a thermal dye receiver element.

The dye donor layer can include a single color area (patch) or multiple colored areas (patches) containing dyes suitable for thermal printing. As used herein, a "dye" can be one or more dyes, pigments, colorants, or a combination thereof, and can optionally be in a binder or carrier as is known to practitioners in the art. For example, the dye layer can include a magenta dye combination and further comprise a yellow dye-donor patch comprising at least one bis-pyrazolone-methine dye and at least one other pyrazolone-methine dye, and a cyan dye-donor patch comprising at least one indoaniline cyan dye.

Dyes can be used in an amount ranging from 0.50 mgs/sqft up to and including 50.00 mgs/sqft, but the amounts are not limited to this range, and this total composition may compose multiple dyes. The dye percent is ideally chosen in view of the specific dye thermal donor element and dye thermal receiver element combination. Varying the amount of dye in the dye thermal donor element can aid in matching the efficiency between different dye patches, for example, a cyan, magenta, and yellow patch. Thus, in some embodiments of this invention, the thermal transfer donor element can comprise one or more patches of thermal yellow, cyan, magenta, or black image dyes dispersed within a polymeric binder, which patches are arranged in a different location than the thermal transferable protective transparent film.

Thermal Transferable Protective Laminate Overcoat: The thermal transferable protective transparent film can be provided in one or more sections, or patches, on the polymeric support in the thermal transfer donor element, or it can be coated or provided on the entire surface or length (if in the form of a web or ribbon) of polymeric support. The thermal transfer donor element can be provided as individual sheets, rolls, webs, or ribbons of any desired width and length suitable for the intended thermal transfer apparatus. Thus, the resulting protective transparent film can be provided in various sizes and dimensions. The patches or sections of thermal transferable materials on a thermal transfer donor element can be the same or different, and can be in a repeating pattern if desired. For example, typical dye patch colors include yellow, cyan, and magenta, although black, white, metallics (such as aluminum or copper), and secondary and tertiary colors can be also provided in a dye patch, along with the thermal transferable protective transparent film.

The thermal transfer donor element can include only a thermal transferable protective transparent film, or it can also include one or more thermal transferable dye patches. It can include one or more desired colored dye patches in a given sequence in combination with a thermal transferable protective transparent film patch (thermal transferable laminate), as described below. The sequence of various patches can repeat, if desired, along a web or ribbon. An exemplary sequence commonly used in thermal dye transfer printing is a repeat of black, yellow, magenta, and cyan dye patches, and thermal transferable protective laminate patch. In many embodiments, the donor element comprises a poly(ethylene terephthalate) support that is coated with one or more patches or a continuous ribbon of the thermal transferable protective transparent film described for this invention.

The thermal transferable laminate disposed on the support of the thermal transfer donor element comprises a plurality of materials in order to provide the desired protective overcoat properties. For example, laminate formulations may comprise one or more poly(vinyl acetal) resins. Such resins may be present in the formulation in an amount ranging from 20.00 mgs/sqft up to and including 70.00 mgs/sqft, or alternatively ranging from 30.00 mgs/sqft up to and including 60.00 mgs/sqft, or alternatively ranging from 40.00 mgs/sqft up to and including 50.00 mgs/sqft, based on the total laminate film dry lay down.

Such poly(vinyl acetal) resins generally have a glass transition temperature (Tg) ranging from 70° C. up to and including 120° C., or alternatively ranging from 80° C. up to and including 110° C., or alternatively ranging from 95° C. up to and including 105° C. They generally have a molecular weight of at least $1.5 \times 10^4$ and up to and including $1.9 \times 10^4$. Exemplary suitable commercial poly(vinyl acetal) resins are available from SEKISUI (Japan), including, for example, BX-1, BX-3, BX-5, BX-L, KS-1, KS-3, KS-5, and KS-10.

The laminate formulation may also comprise a thermoplastic cellulose ester resin. Suitable cellulose ester resins are CAP resins. Exemplary commercial CAP resins are available from EASTMAN, NAGASE, REIFENHAUSER, and ROTUBA, including, for example, CAP-482-20 (by EASTMAN) and TENITE (by REIFENHAUSER). Cellulose ester resins, to the extent they are included in the laminate formulation, are generally present in a specific amount in relation to the dry amount of the poly(vinyl acetal) resin. For example, the dry weight ratio of poly(vinyl acetal) resin to cellulose ester resin may range from 5:1 up to and including 12:1, or alternatively 6:1 up to and including 10:1. In certain embodiments, the cellulose ester resin can be present in an amount ranging from 0.00 mgs/sqft up to and including 15.00 mgs/sqft, or alternatively ranging from 2.00 mgs/sqft up to and including 10.00 mgs/sqft, based on the total laminate lay down.

Embodiments of laminate formulations may also comprise one or more PMMA resins. Suitable PMMA resins have a molecular weight within a particular range. For example, PMMA materials in embodiments of the present invention have a molecular weight ranging from 15,000 up to and including 100,000, or alternatively from 20,000 up to and including 40,000, or alternatively from 25,000 up to and including 35,000. A useful PMMA resin used in certain embodiments has a molecular weight of about 30,000. PMMA resins may be included in the laminate formulation in an amount ranging from 0 to 50.00 mg/sqft, or alternatively ranging from 15.00 to 35.00 mg/sqft, or alternatively ranging from 20.00 to 30.00 mg/sqft. Exemplary commercial PMMA materials are available from DIANAL AMERICA, INC., including, for example, BR-73, BR-78, BR-80, BR-87, BR-113, BR-121DA, MB-2519, MB-2660, MB-2823, and MB-7033.

Laminate formulations used today and in the past have generally included colloidal silica as an essential component. This material is available from various commercial sources, including as IPA-ST from COLUMBUS CHEMICAL INDUSTRIES and NISSAN CHEMICAL. According to certain embodiments of the present invention, thermal donor laminate formulations are made substantially free of colloidal silica, or alternatively without colloidal silica entirely.

Laminate formulation embodiments of the present invention may further comprise UV-absorbing light stabilizer materials. Exemplary UV absorbers are materials that have an intramolecular hydrogen bond, such as materials based on hydroxyphenyl-s-triazines. UV absorbing material may be included in the laminate composition in an amount ranging from 0.00 to 20.00 mg/sqft, or alternatively ranging from 5.00 to 10.00 mg/sqft. An exemplary commercial UV-absorbing material is TINUVIN 460 from BASF.

Other embodiments may further comprise one or more release agents. Suitable release agents include fluorine modified silicone fluids. Release agents may be included in the laminate composition in an amount ranging from 0.00 to 10.00 mg/sqft, or alternatively ranging from 0.00 to 5.00 mg/sqft. And, in certain embodiments, it is useful to include a release agent in an amount ranging from 2.00 to 3.00 mgs/sqft. Exemplary commercial release agents are available from ADVANCED POLYMER, INC., including, for example, APS-D4, APS-210, APS-215, APS-230, APS-297, APS-324, APS-327, APS-328, APS-340, APS 689, APS-690, APS-691, APS-692, APS-704, and APS-705.

Donor-layer materials (in dye-containing and laminate compositions) can be dissolved in one or more solvents for coating purposes. Solvent packages are important to laminate formulations. They contribute to solubility and viscosity, which are important physical characteristics to ensure proper transfer, coating, and protective performance. When materials are added or removed from a composition, these physical characteristics may be affected. The solvent package may need to be adjusted accordingly to ensure it complements the materials in the composition.

To provide a proper dispersion of colloidal silica, laminate formulations often included DEK as a solvent. DEK, like colloidal silica, is a relatively expensive material. Certain embodiments of the present invention that do not include colloidal silica also do not include DEK. In place of DEK, suitable solvents that may be used include one or more of n-hexane, methanol, methyl n-butyl ketone, methyl ethyl ketone, toluene, and hexanedione. Some laminate formulation embodiments comprise solvent packages combining two or more of such solvents in various weight ratios. A useful solvent package for certain embodiments is a combination of methanol and toluene in a 30:70 ratio.

The thermal transferable protective transparent film can also include one or more compounds used to provide light stability. Various compounds for this purpose include but are not limited to nickel complexes, hindered amine light stabilizers, and N-oxyl radicals derived from hindered amines Such compounds are described for example in U.S. Pat. No.

4,855,281 (Byers), U.S. Pat. No. 7,301,012 (Fujiwara), and U.S. Pat. No. 7,384,138 (Taguchi), all of which are incorporated herein by reference, as well as U.S. Patent Application Publication 2011/0067804 (Vreeland). The N-oxyl radicals having a molecular weight of 600 or less and defined by Formula III in the noted Vreeland publication are particularly useful to stabilize transferred cyan dye images. Useful amounts of the light stabilizers range from at least 0.05 mgs/sqft up to and including 10.00 mgs/sqft, and the amounts can be the same or different for the various dye patches (described below) as well as the thermal transferable protective transparent films.

Other optional addenda that can be incorporated in donor laminate formulation embodiments include antistatic agents, defoamers, coating aids, charge control agents, thickeners or viscosity modifiers, antiblocking agents, coalescing aids, crosslinking agents or hardeners, soluble or solid particle dyes, adhesion promoting agents, bite solvents or chemical etchants, lubricants, antioxidants, stabilizers, colorants or tints, fillers, and other materials well known in this art, and in known amounts.

Any of the thermal transfer donor embodiments of the present invention can be provided in a thermal transfer assembly, in which the thermal donor element is arranged in thermal association with a thermal dye transfer receiver element. Such assemblies can be used according to processes known in the art—e.g., involving the application of thermal energy (heat) to cause dye-containing donor material and/or donor laminate to transfer to a thermal receiver element.

The following examples are offered to aid in understanding the embodiments of the invention described herein. These examples are not be construed as limiting the scope of any embodiment of the present invention.

Exemplary thermal transfer donor elements were prepared and evaluated as follows. The donor elements comprised a 4.5 μm thick polyethylene terephthalate (PET) support that had been previously coated on one side with a subbing layer of titanium alkoxide and a silicone-free slipping layer as described in U.S. Pat. No. 7,501,382 B2 (Foster et al., slip layer in Invention Example 2, Col. 32, lines 37-62). A number of donor laminate formulations were prepared, as detailed in Table 1, and coated on a sample of the support (on the side opposite the slipping layer) by a direct gravure method at a 61 m/min coating speed and dried at 82° C. to provide a dry coating of 25 mg/sqft.

$D_{max}$ prints were created in a mechanized version of the KODAK Photo Printer 6850 using commercially available thermal dye transfer receiving paper and thermal dye donor ribbon from KODAK ALARIS. The thermal receiving paper was patchwise-coated with cyan, magenta, and yellow dyes in a cellulose acetate propionate binder. After thermally transferring the dyes from the dye donor ribbon to the thermal dye transfer receiving paper, each $D_{max}$ print was further provided with a protective overcoat by thermally transferring the exemplary donor laminate formulations of Table 1.

The $D_{max}$ print having the protective overcoat was then evaluated for flash, satin back transfer, and scratch resistance. Scratch resistance was tested using a balanced beam scrape adhesion and Mar Tester (ASTM D2197). In this test, the $D_{max}$ prints were scratched by dragging a tungsten carbide tipped stylus (with an edge radius of 375 μm) at a tip angle of 30° (with respect to the normal) at a speed of 50.8 mm/second under varying loads over the surface of each $D_{max}$ print. The load was varied in 10 gram increments up to 1000 grams until a visible white scratch was barely noticed on the black background of the $D_{max}$ print. The load (in grams) at which the visible white scratch appeared is reported. The higher the load the more scratch-resistant is the protective overcoat. The procedure was repeated along the printing direction and the cross direction for each $D_{max}$ print.

Flash was evaluated qualitatively using a scale of 0 to 5, where a rating of "0" indicates no flash. A rating of "3" or higher might not be commercially acceptable. Flash was tested for both $D_{max}$ and $D_{min}$ prints, at both the lead edge ("L-E") and side edge ("S-E") of the thermal receiver paper. A $D_{max}$ print is when all dyes or essentially all dyes are thermally transferred to a receiver (e.g., the highest extent of thermal transfer). A $D_{min}$ print is when no dyes or essentially no dyes are thermally transferred to a receiver (e.g., the lowest extent of thermal transfer).

Iridescence is the phenomenon of certain surfaces that appear to gradually change color as the angle of view or the angle of illumination changes. Iridescence was evaluated visually by subjecting each example print to a light source and rotating and adjusting the positioning of the print with respect to the light. The results were evaluated qualitatively using a scale of 0 to 5, where a rating of "0" indicates no iridescence and a rating of "5" indicates severe iridescence.

Satin back transfer was evaluated qualitatively using a scale of 0 to 5, where a rating of "0" indicates no satin back transfer and a rating of "5" indicates severe satin back transfer. A rating of "3" or higher might not be commercially acceptable. In some instances when testing for satin back transfer, one may observe bubbling, which is not preferable.

Performance results for the exemplary donor laminate formulations are detailed in Table 2.

The following table lists some of the raw materials used in the following examples. Alternative materials from other suppliers may be substituted to the extent such substitutions would be recognized by a person of skill in the art to be an equivalent substitute material.

| Material | Trade Name | Supplier |
|---|---|---|
| Poly(vinyl acetal) Resin | KS-10 | Sekisui (Japan) |
| PMMA Resin | BR-113 | Dianal America, Inc. |
| Cellulose Acetate Propionate | CAP-482-20 | Eastman |
| Release Agent | APS-689 | Advanced Polymer, Inc. |
| UV-Absorber | TINUVIN 460 | BASF |
| Solvents: | | |
| Methanol (MeOH) | | |
| Toluene | | |

TABLE 1

| Units mgs/sqft | E1 | E2 | E3 | E4 | E5 |
|---|---|---|---|---|---|
| KS-10 | 40.00 | 45.00 | 40.00 | 45.00 | 50.00 |
| BR-113 | 30.00 | 15.00 | 0.00 | 15.00 | 30.00 |
| CAP-482-20 | 10.00 | 5.00 | 0.00 | 5.00 | 0.00 |
| APS-689 | 2.25 | 2.25 | 2.25 | 2.25 | 2.25 |
| Tinuvin 460 | 9.57 | 9.57 | 9.57 | 9.57 | 9.57 |
| Solvent(s) | MeOH/ Toluene (30:70) | MeOH/ Toluene (30:70) | MeOH/ Toluene (30:70) | MeOH/ Toluene (30:70) | MeOH/ Toluene (30:70) |

| Units mgs/sqft | E6 | E7 | E8 | E9 | E10 |
|---|---|---|---|---|---|
| KS-10 | 50.00 | 40.00 | 50.00 | 50.00 | 40.00 |
| BR-113 | 0.00 | 30.00 | 0.00 | 30.00 | 0.00 |
| CAP-482-20 | 10.00 | 0.00 | 0.00 | 10.00 | 10.00 |

TABLE 1-continued

|  | | | | | |
|---|---|---|---|---|---|
| APS-689 | 2.25 | 2.25 | 2.25 | 2.25 | 2.25 |
| Tinuvin 460 | 9.57 | 9.57 | 9.57 | 9.57 | 9.57 |
| Solvent(s) | MeOH/Toluene (30:70) | MeOH/Toluene (30:70) | MeOH/Toluene (30:70) | MeOH/Toluene (30:70) | MeOH/Toluene (30:70) |

| Units mgs/sqft | E11 | E12 | E13 | E14 | E15 |
|---|---|---|---|---|---|
| KS-10 | 45.00 | 45.00 | 45.00 | 45.00 | 45.00 |
| BR-113 | 15.00 | 30.00 | 30.00 | 30.00 | 30.00 |
| CAP-482-20 | 5.00 | 0.00 | 2.00 | 3.00 | 6.00 |
| APS-689 | 2.25 | 2.25 | 2.25 | 2.25 | 2.25 |
| Tinuvin 460 | 9.57 | 9.57 | 9.57 | 9.57 | 9.57 |
| Solvent(s) | MeOH/Toluene (30:70) | MeOH/Toluene (30:70) | MeOH/Toluene (30:70) | MeOH/Toluene (30:70) | MeOH/Toluene (30:70) |

| Units mgs/sqft | E16 |
|---|---|
| KS-10 | 45.00 |
| BR-113 | 30.00 |
| CAP-482-20 | 8.00 |
| APS-689 | 2.25 |
| Tinuvin 460 | 9.57 |
| Solvent(s) | MeOH/Toluene (30:70) |

TABLE 2

|  | Iridescence | Flash L-E DMAX | Flash S-E DMAX | Flash L-E DMIN | Flash S-E DMIN | SBT |
|---|---|---|---|---|---|---|
| E1 | 0 | 0 | 0 | 0 | 0 | 0 |
| E2 | 0 | 0 | 0 | 0 | 0 | 0 |
| E3 | 2 | 0 | 0 | 0 | 0 | 1 |
| E4 | 1 | 0 | 0 | 0 | 0 | 0 |
| E5 | 0 | 0 | 0 | 0 | 0 | Bubbles |
| E6 | 2 | 0 | 0 | 0 | 0 | 1 |
| E7 | 0 | 0 | 0 | 0 | 0 | Bubbles |
| E8 | 3 | 0 | 0 | 4 | 0 | 0 |
| E9 | 0 | 0 | 0 | 0 | 0 | 0 |
| E10 | 1 | 0 | 0 | 0 | 0 | 1 |
| E11 | 1 | 0 | 0 | 0 | 0 | 1 |
| E12 | 0 | 0 | 0 | 0 | 0 | Bubbles |
| E13 | 0 | 0 | 0 | 0 | 0 | Bubbles |
| E14 | 0 | 0 | 0 | 0 | 0 | Bubbles |
| E15 | 0 | 0 | 0 | 0 | 0 | 1 |
| E16 | 0 | 0 | 0 | 0 | 0 | 0 |

The invention claimed is:

1. A thermal donor laminate formulation comprising:
   a polymeric binder resin comprising a polyvinyl acetal resin with a glass transition temperature (Tg) between about 70 to 120 degrees Celsius;
   a polymethyl methacrylate resin with a molecular weight ranging from 15,000 up to and including 100,000;
   an organic solvent; and
   a cellulose ester resin.

2. The thermal donor laminate formulation of claim 1, wherein the cellulose ester resin comprises cellulose acetate propionate.

3. The thermal donor laminate formulation of claim 1, wherein the organic solvent is not diethyl ketone.

4. The thermal donor laminate formulation of claim 1, wherein the formulation does not include colloidal silica.

5. The thermal donor laminate formulation of claim 1, wherein the solvent comprises one or more of n-hexane, methanol, methyl n-butyl ketone, methyl ethyl ketone, toluene, or hexanedione.

6. The thermal donor laminate formulation of claim 1, wherein a dry weight ratio of the polyvinyl acetal resin to the cellulose ester resin is from about 5:1 to about 12:1.

7. The thermal donor laminate formulation of claim 1, further comprising:
   one or more release agents.

8. The thermal donor laminate formulation of claim 1, further comprising:
   UV absorbing light stabilizer materials.

* * * * *